United States Patent
Vesperini et al.

(10) Patent No.: US 11,709,140 B2
(45) Date of Patent: Jul. 25, 2023

(54) METHOD AND APPARATUS FOR CHECKING THE PRODUCTION QUALITY OF CABLES THAT ARE PROVIDED WITH A PROTECTIVE SHEATH, IN PARTICULAR ELECTRICAL CABLES

(71) Applicant: SEMPLICE S.P.A., Milan (IT)

(72) Inventors: Fabio Vesperini, Cossignano (IT); Diego Droghini, Ascoli Piceno (IT)

(73) Assignee: SEMPLICE S.P.A., Milan (IT)

( * ) Notice: Subject to any disclaimer, the term of this patent is extended or adjusted under 35 U.S.C. 154(b) by 518 days.

(21) Appl. No.: 16/907,928

(22) Filed: Jun. 22, 2020

(65) Prior Publication Data
US 2020/0408696 A1 Dec. 31, 2020

(30) Foreign Application Priority Data
Jun. 27, 2019 (IT) .......................... 102019000010242

(51) Int. Cl.
*G01N 21/88* (2006.01)
*H01B 7/17* (2006.01)
*H01B 13/012* (2006.01)

(52) U.S. Cl.
CPC ........... *G01N 21/8851* (2013.01); *H01B 7/17* (2013.01); *H01B 13/012* (2013.01)

(58) Field of Classification Search
CPC ...... G01N 21/8851; G01N 21/25; H01B 7/17; H01B 13/012; H01B 13/0036; G06T 7/90; G06T 2207/10024; G06T 2207/20084; G06T 7/0004; G06T 7/0002
See application file for complete search history.

(56) References Cited

U.S. PATENT DOCUMENTS

2020/0160504 A1* 5/2020 Duncan .............. H01B 13/0036

OTHER PUBLICATIONS

Ghidoni Stefano et al. "Automatic Color Inspection for Colored Wires in Electric Cables", IEEE Transactions on Automation Science and Engineering, IEEE Service Center, Apr. 2015, vol. 12, No. 2, pp. 596-607, XP011577521.
IT Search Report dated Dec. 9, 2019 re: Application No. 102019000010242, pp. 1-8, citing: Niko Merivirta "Improvement of Quality . . . ", Juha Saily et al. "In-Line Real-Time Surface . . . " and Ghidoni Stefano et al. "Automatic Dolor Inspection . . . ".

(Continued)

*Primary Examiner* — Jonathan M Hansen
(74) *Attorney, Agent, or Firm* — Cantor Colburn LLP

(57) ABSTRACT

A method for checking the production quality of a cable that is provided with a protective sheath, in particular an electrical cable, includes the steps of
acquiring images of an external surface of the cable by way of one or more digital video cameras, while the cable is moved along an advancement axis. The method also includes
processing the images by way of one or more algorithms in order to calculate one or more numeric indices, each one of which is proportional to a respective optically-detectable characteristic of the external surface of the cable.

9 Claims, 7 Drawing Sheets

(56) References Cited

OTHER PUBLICATIONS

Juha Saily et al. "In-Line Real-Time Surface Roughness Measurement of Insulated Wires and Cables and How Manufacturers Can Use It for Improved Product Quality and Increased Production Output", Proceedings of the 65th IWCS: IWCS: The International Cable & Connectivity Symposium, Oct. 2, 2016, pp. 687-694, XP055650835, http:/www.iwcs.org/polopoly_fs/1.3285670. 1474652076!/fileserver/file/687340/filename/117_0779-000184.pdf.
Niko Merivirta, "Improvement of Quality Control of Extruded Tubes With On-Line Optical Measuring Technique", Master of Science Thesis, Aug. 2017, Chapters 5-9, Figures 35-65, XP05560723, URL:https://dspace.cc.tut.fi/dpub/bitstream/handle/123456789/25079/Merivirta.pdf?sequence=1&usAllowed=y.

* cited by examiner

METHOD AND APPARATUS FOR CHECKING THE PRODUCTION QUALITY OF CABLES THAT ARE PROVIDED WITH A PROTECTIVE SHEATH, IN PARTICULAR ELECTRICAL CABLES

CROSS-REFERENCE TO RELATED APPLICATIONS

This application is related to and claims the benefit of Italian Patent Application No. 102019000010242, filed on Jun. 27, 2019, the contents of which are herein incorporated by reference in their entirety.

TECHNICAL FIELD

The present disclosure relates to a method and an apparatus for checking the production quality of cables that are provided with a protective sheath, in particular electrical cables, which is useful and practical particularly, but not exclusively, for quality control in production facilities for electrical cables, downstream of a method of extrusion with which the cable is covered with the sheath.

BACKGROUND

The following automated methods of checking the production quality of electrical cables are known and normally used: diameter checks using gauges, "lump/neck" checks which consist of detecting macroscopic geometric deformations of the cable using special sensors, and the test known as "spark test", which consists of checking the composition of the metallic part via the analysis of sparks generated by friction.

Any other checks, in particular checks of the quality of the protective sheath (for example roughness and color of the surface of the sheath), are nowadays entrusted to the direct supervision of an operator, who checks the cables "by sight", and to his or her subjective judgment.

The known art just described exhibits considerable drawbacks, among which is the fact that the checks of the external surface of the cable can only be conducted on a sample, since a "manual" or "sight" check along the entire length of the cable produced would require unsustainable times and costs.

Furthermore, the precision and reliability of this type of checks are very limited and often insufficient to ensure a high standard of quality: in fact, no matter how expert and well trained, an operator is capable of detecting only macroscopic defects that are visible to the naked eye.

Another limitation of this category of checks consists in the fact that they cannot be standardized or automated.

Another limitation of this category of checks consists in the fact that they cannot be executed in real time during the production process, given the high speed at which the cable proceeds along the production line; therefore the detection of any defects can occur only later on, which does not permit a prompt corrective intervention on the production line.

SUMMARY

The present disclosure provides a method and an apparatus for checking the production quality of cables that are provided with a sheath which enable checking that is more precise and reliable with respect to the known art.

Within this aim, the present disclosure provides a method and an apparatus for checking the production quality of cables that are provided with a sheath which make it possible to check the entire production.

The present disclosure relates to providing a method and an apparatus for checking the production quality of cables that are provided with a sheath which make it possible to check the cable during the production process.

The present disclosure relates to providing a method and an apparatus for checking the production quality of cables that are provided with a sheath which enable checking that can be automated and standardized.

The present disclosure relates to providing a method and an apparatus for checking the production quality of cables that are provided with a sheath which do not slow down the production process.

The disclosure relates to providing a method and an apparatus for checking the production quality of cables that are provided with a sheath which permit prompt corrective interventions on the production line.

The present disclosure also provides a method and an apparatus for checking the production quality of cables that are provided with a sheath which are highly reliable, easily and practically implemented, and economically competitive when compared to the known art.

This aim and these and other advantages which will become better apparent hereinafter are achieved by providing a method for checking the production quality of a cable that is provided with a protective sheath, in particular an electrical cable, the method including the steps of:
  acquiring images of an external surface of said cable by way of one or more digital video cameras, while said cable is moved along an advancement axis; and
  processing said images by way of one or more algorithms in order to calculate one or more numeric indices, each one of which is proportional to a respective optically-detectable characteristic of said external surface of said cable.

This aim and these and other advantages which will become better apparent hereinafter are also achieved by providing an apparatus for checking the production quality of a cable that is provided with a protective sheath, in particular an electrical cable, according to the claims.

BRIEF DESCRIPTION OF THE DRAWINGS

Further characteristics and advantages of the disclosure will become better apparent from the detailed description of a preferred, but not exclusive, embodiment of a method and an apparatus for checking the production quality of cables that are provided with a sheath, which is illustrated by way of non-limiting example with the aid of the accompanying drawings wherein.

DETAILED DESCRIPTION OF THE DRAWINGS

Figure 1:
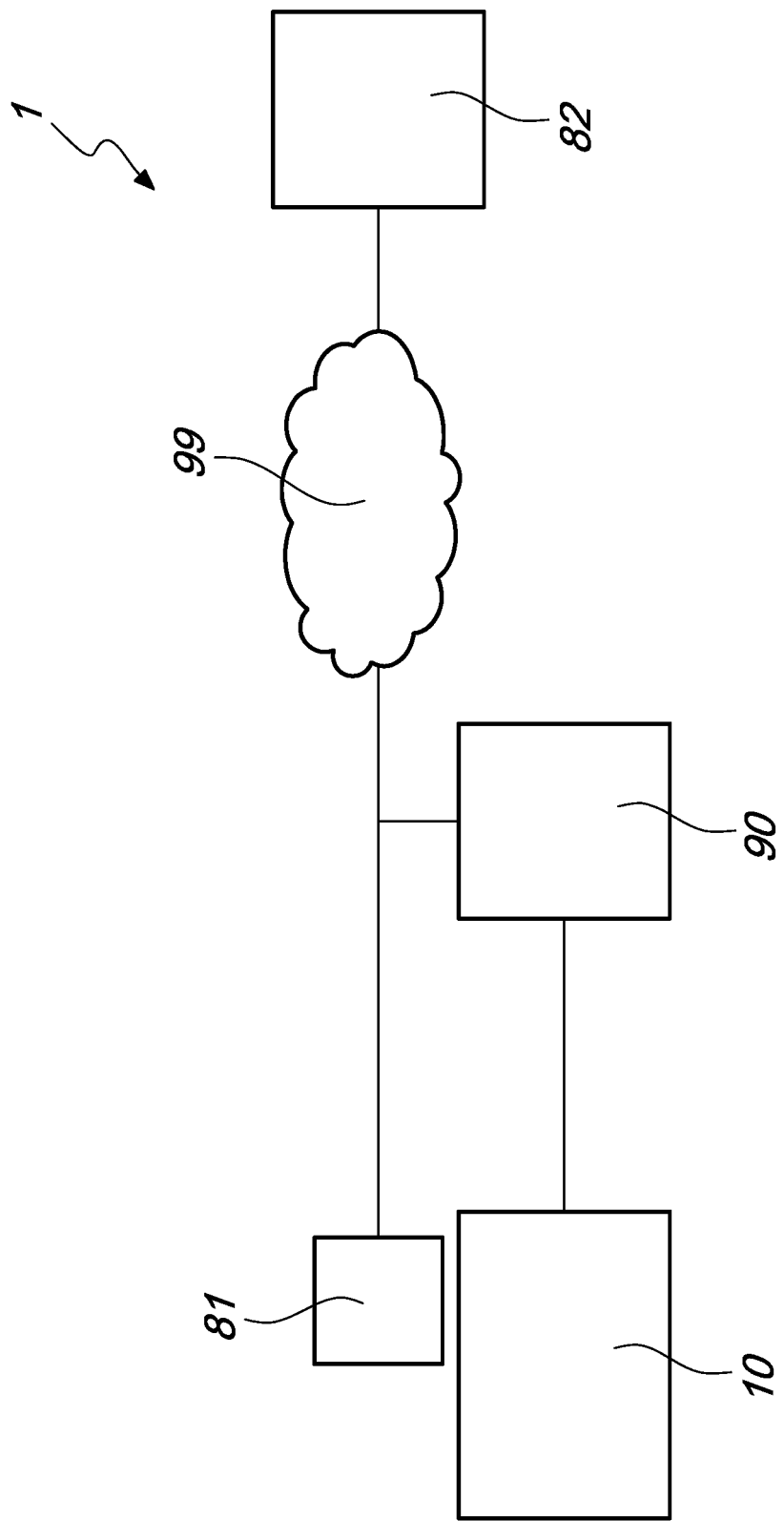
FIG. 1 is a block diagram illustrating a possible embodiment of the apparatus for checking the production quality of cables that are provided with a sheath, according to the present disclosure.
Figure 2:
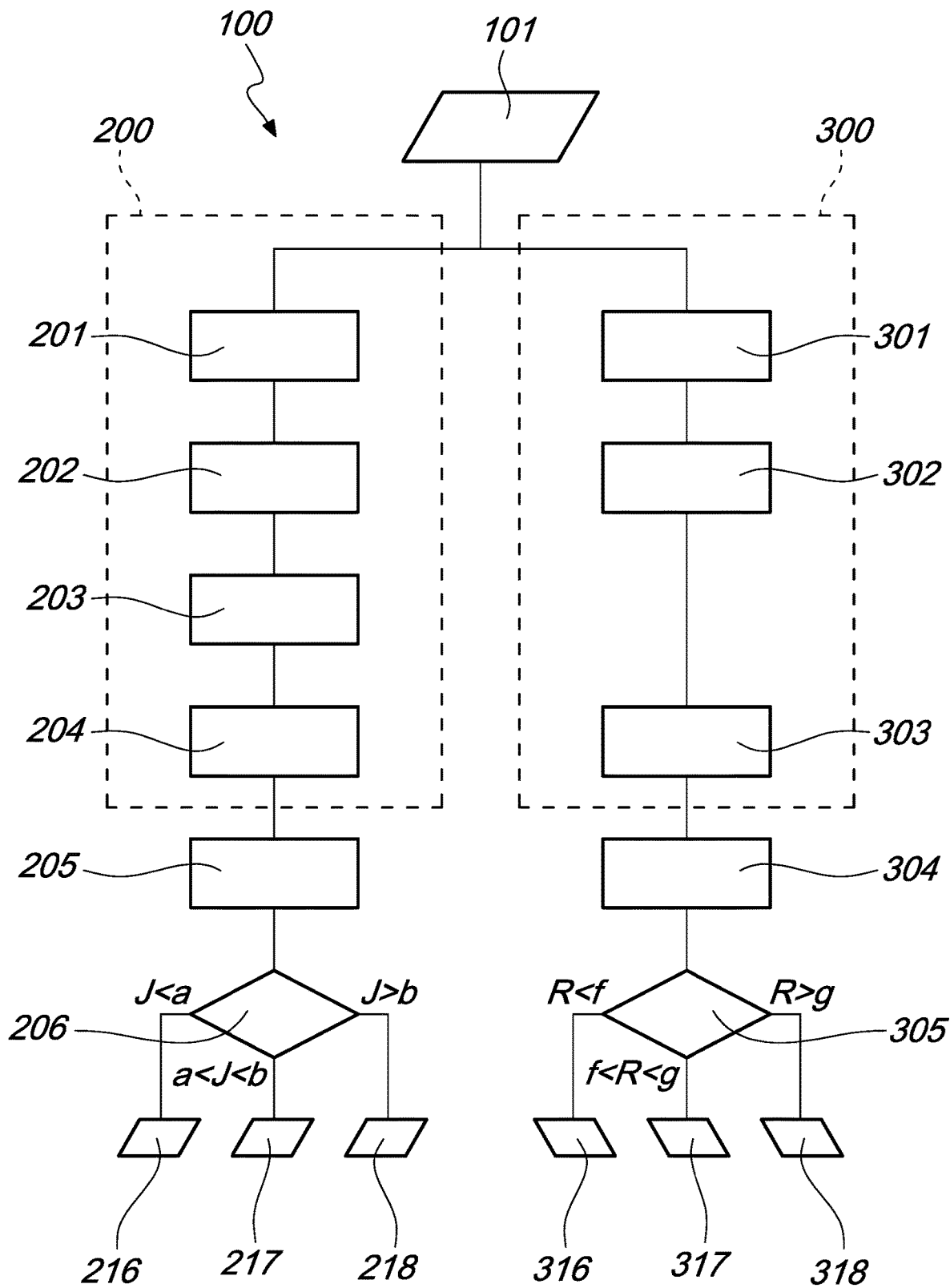
FIG. 2 is a flowchart illustrating a possible embodiment of the method for checking the production quality of cables that are provided with a sheath, according to the present disclosure.

With reference to the figures, the method for checking the production quality of a cable C that is provided with a protective sheath, in particular an electrical cable, which in FIG. 2 is generally designated by the reference numeral 100, is adapted in particular to be carried out in order to check the quality of the protective sheath of the cable C during the production process, and preferably downstream of an extrusion procedure with which the cable C is normally covered with the sheath.

According to the disclosure, as shown schematically by the flowchart in FIG. 2, images are acquired (block 101 of the chart) of the external surface of the cable C (and more precisely of the external surface of the sheath) by way of one or more digital video cameras 20, preferably while the cable C is moved as it exits from the production apparatus along an advancement axis W. More generally, according to the disclosure, the images can be acquired while the cable C is moved along any advancement axis W at any point of the production line or optionally even outside it, at another time.

In practice, the at least one digital video camera 20 is pointed toward the cable C so as to target and capture the external surface of this (and therefore of the sheath), thus producing, in a known manner, a series of digital images (i.e. frames) of such external surface which then can be processed and analyzed, for example by way of software.

The images thus acquired are processed by way of one or more algorithms 200, 300—by way of adapted software that implements these algorithms 200, 300 and of an electronic processing unit 90 that runs the software—in order to calculate one or more numeric indices J, R, each one of which is proportional to a respective optically-detectable characteristic.

The term "optically-detectable characteristic" means, in the present description and in the accompanying claims, a characteristic that is visible (optionally following an enlargement or processing of images) and quantifiable (i.e. measurable or definable via a numeric value), of the external surface of the cable C.

The optically-detectable characteristics to which reference is made are, in particular, the color (and more precisely the color distance, or color drift, from a predetermined reference color) and the roughness.

Preferred examples of an algorithm 200 for calculating a numeric index J that is proportional to the color distance from a reference color and of an algorithm 300 for calculating a numeric index R that is proportional to the roughness, from digital images, will be described in detail below.

Each one of the numeric indices J, R therefore expresses the difference between an optimal value of the respective optically-detectable characteristic and the detected value calculated via the algorithm 200, 300 (the greater the difference, the worse the production quality will be).

Optionally, each one of the above mentioned numeric indices J, R can be displayed on an adapted interface, such as for example a screen or a counter, in order to enable the real-time monitoring of production quality based on the optically-detectable characteristics being taken into consideration.

Preferably, each one of the above mentioned one or more numeric indices J, R is compared (blocks 205 and 304 of the flowchart) with a respective threshold value b, g and if one of such one or more numeric indices J, R is greater than the respective threshold value b, g then (blocks 206 and 305) an alarm signal 218, 318 is produced.

Even more preferably, each numeric index J, R is compared with a pair of threshold values a, b and g, f which between them define a tolerance interval (i.e. a respective lower threshold value a, b and a respective upper threshold value b, g, which is greater than the respective lower threshold value a, b) and therefore (blocks 206 and 305):

if the numeric index J, R is less than the lower threshold value a, b, then a first corresponding signal 216, 316 is produced which indicates an optimal level of quality for the respective optically-detectable characteristic (for example a green light on a display that indicates an optimal roughness value or color value);

if the numeric index J, R is comprised between the lower threshold value a, b, and the upper threshold value f, g, then a second corresponding signal 217, 317 is produced which indicates an acceptable level of quality for the respective optically-detectable characteristic (for example a yellow light on a display that indicates a roughness value or color value that is not optimal but acceptable);

if the numeric index J, R is greater than the upper threshold value b, g, then an alarm signal 218, 318 is produced which indicates an unacceptable level of quality for the respective optically-detectable characteristic (for example a red light on a display and/or an acoustic alarm that indicates an unacceptable roughness value or color value).

For example, in the preferred embodiments, a numeric color index J (by way of a first algorithm 200) and a numeric roughness index R (by way of a second algorithm 300) are calculated from the images acquired by the digital video camera 20.

The color index J (which as previously mentioned measures the color distance from a predetermined reference color) is compared with a pair of predetermined threshold values a, b which between them define a tolerance interval and which are produced, on an adapted interface 81, a first signal indicating an optimal color 216 (when this color index J is less than the tolerance interval, i.e. J<a), or an acceptable color signal 218 (when the color index J is comprised in the range of tolerances, i.e. a<J<b), or an alarm signal 218 (when the color index J is greater than the respective tolerance interval, i.e. J>b).

The same is done for the roughness index R, by comparing it with the respective threshold values f, g, resulting in respective signals of optimal roughness 316 or of acceptable roughness 317, or an alarm signal 318, as a function of the outcome of the comparison.

In some simplified embodiments, only one of the indices J, R described above is calculated. In other embodiments, further indices are calculated which correspond to other optically-detectable characteristics, in addition to the ones described above, in a similar manner.

Turning now in more detail to the first algorithm 200 used for calculating a numeric color index J that is proportional to the color difference between a color of the external surface of the cable C and a predetermined reference color, in the preferred embodiments this numeric color index J is defined as the Euclidean distance d between a set of three cylindrical coordinates $(H_P, S_P, L_P)$ of a main color of the image acquired using the digital video camera 20 and a set of three cylindrical coordinates ($H_T,S_T,L_T$) of the reference color (which is chosen in advance).

As is known, a digital image is composed of a plurality of pixels, each one of which has a determined color, and the main color is identified for example as the majority color among the pixels of the image.

Figure 3:
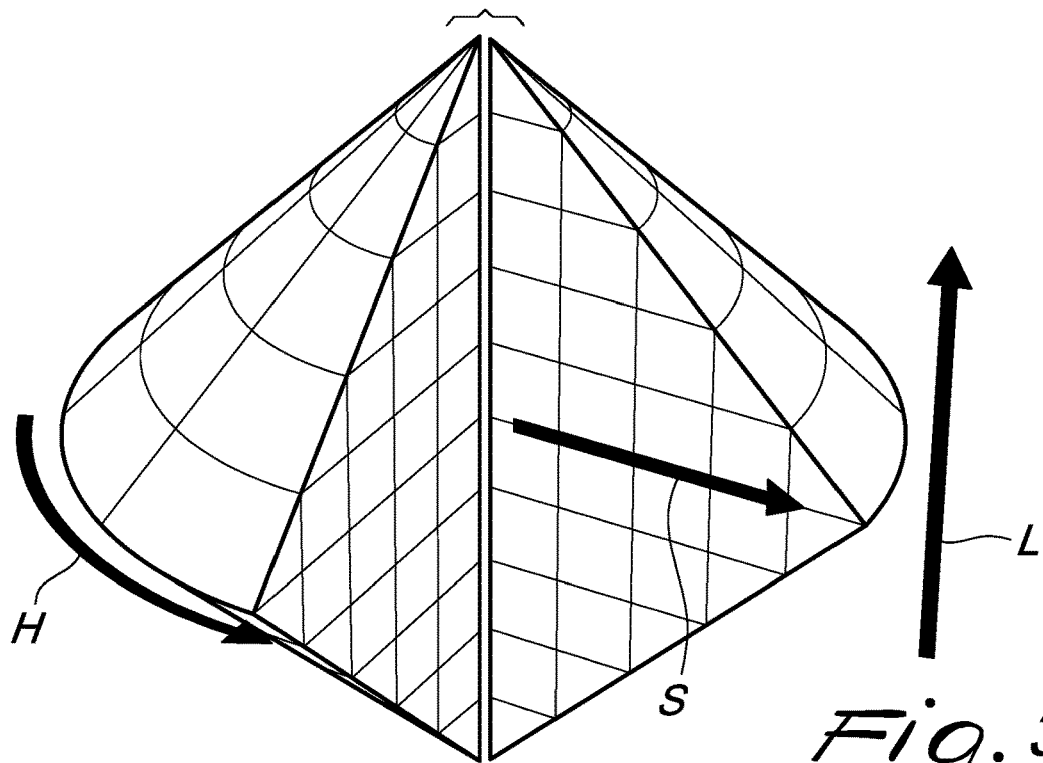
FIGS. 3 and 4 are graphs illustrating some mathematical aspects of an algorithm executed in a particular embodiment of the method shown in FIG. 2.

The sets of three cylindrical coordinates ($H_P,S_P,L_P$), ($H_T,S_T,L_T$) are the sets of three values H, S, L that, in a known manner, identify each color in the HSL (Hue-Saturation-Lightness) space, in which, as shown in FIG. 3, the first value H indicates the wavelength (or Hue) of the color expressed in terms of angle from 0° to 360°; the second value S indicates the intensity (or Saturation) of the color; and the third value L indicates the luminosity (or Lightness), i.e. the distance from white and from black.

The values of the HSL coordinates of a color of a pixel can be calculated via software in a known manner.

Since normally the digital video camera 20 produces digital images in the RGB (Red-Green-Blue) format, the digital images acquired are first converted, in a known manner, from RGB space to HSL space.

Figure 4:
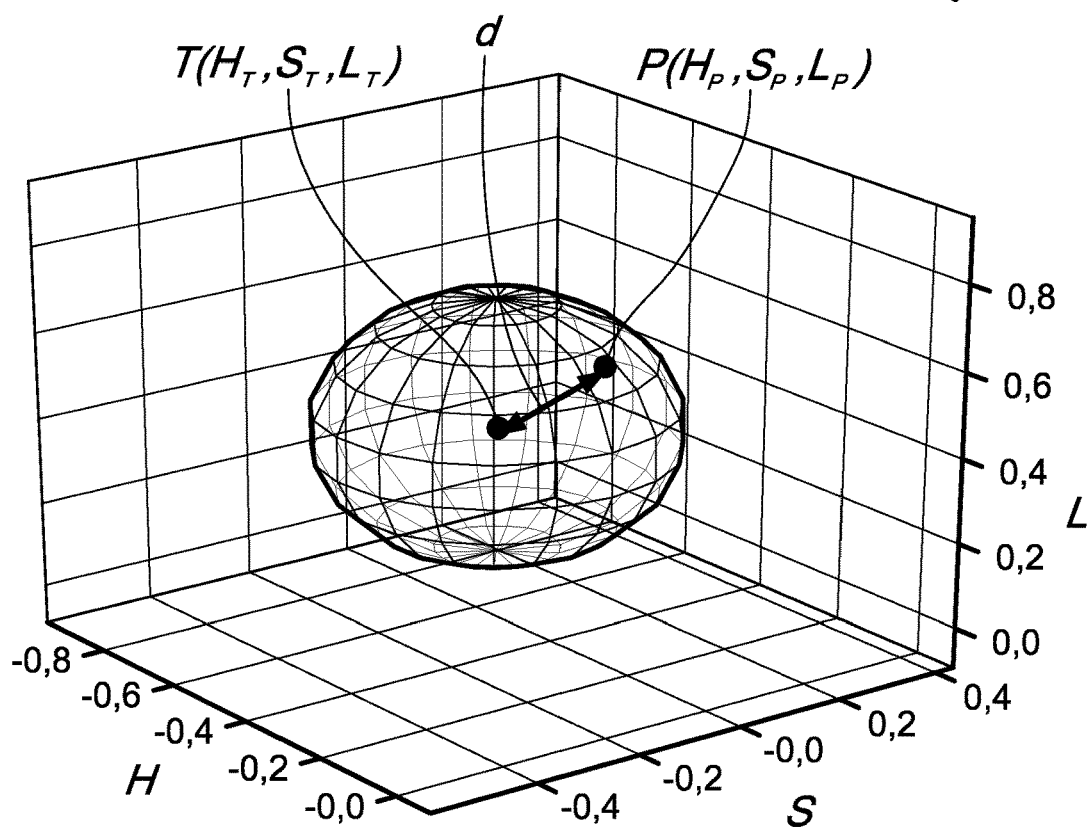
Figure 5:
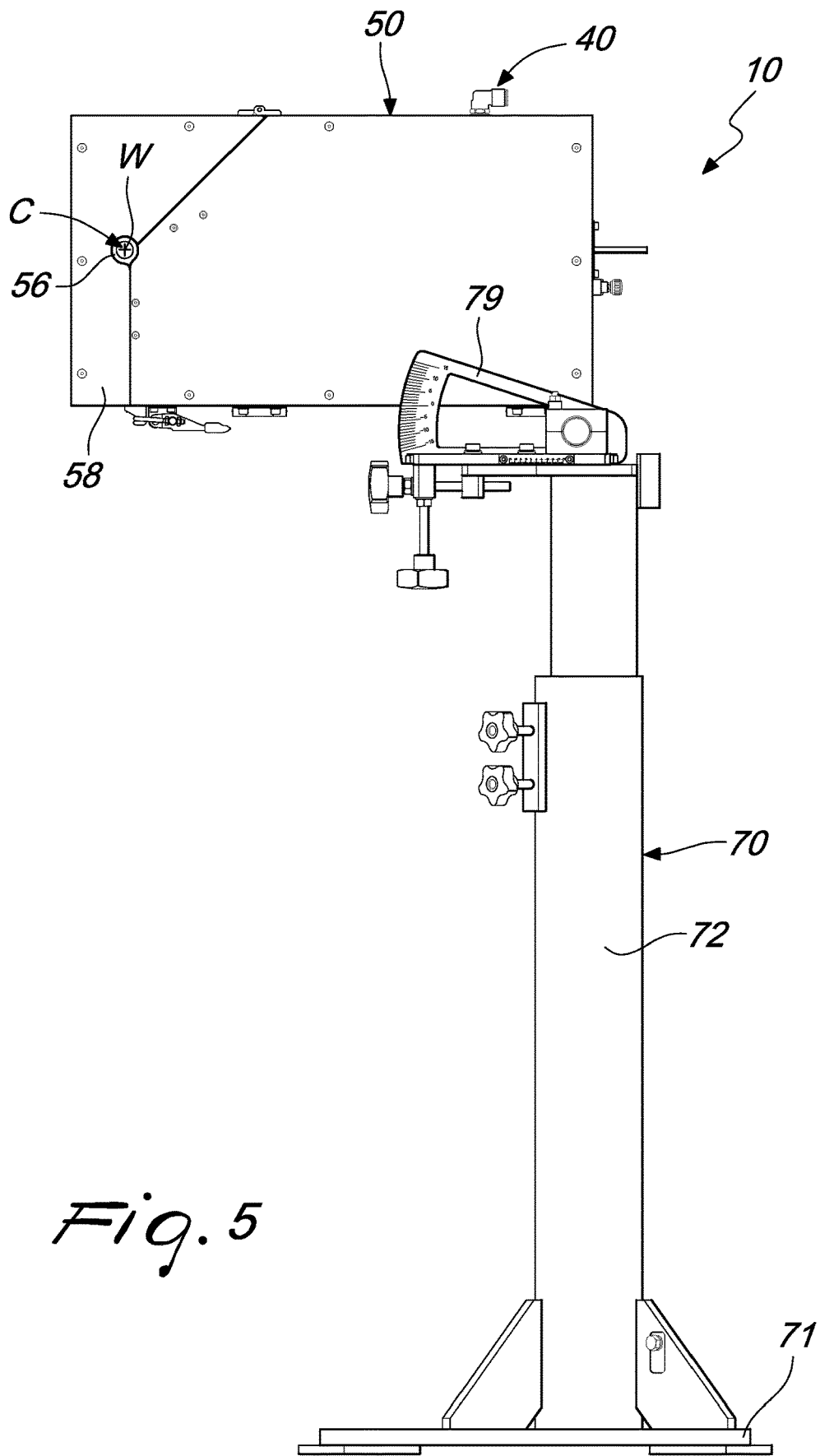
FIG. 5 is a side view of a part of a possible embodiment of the apparatus for checking the production quality of cables that are provided with a sheath, according to the present disclosure.
Figure 6:
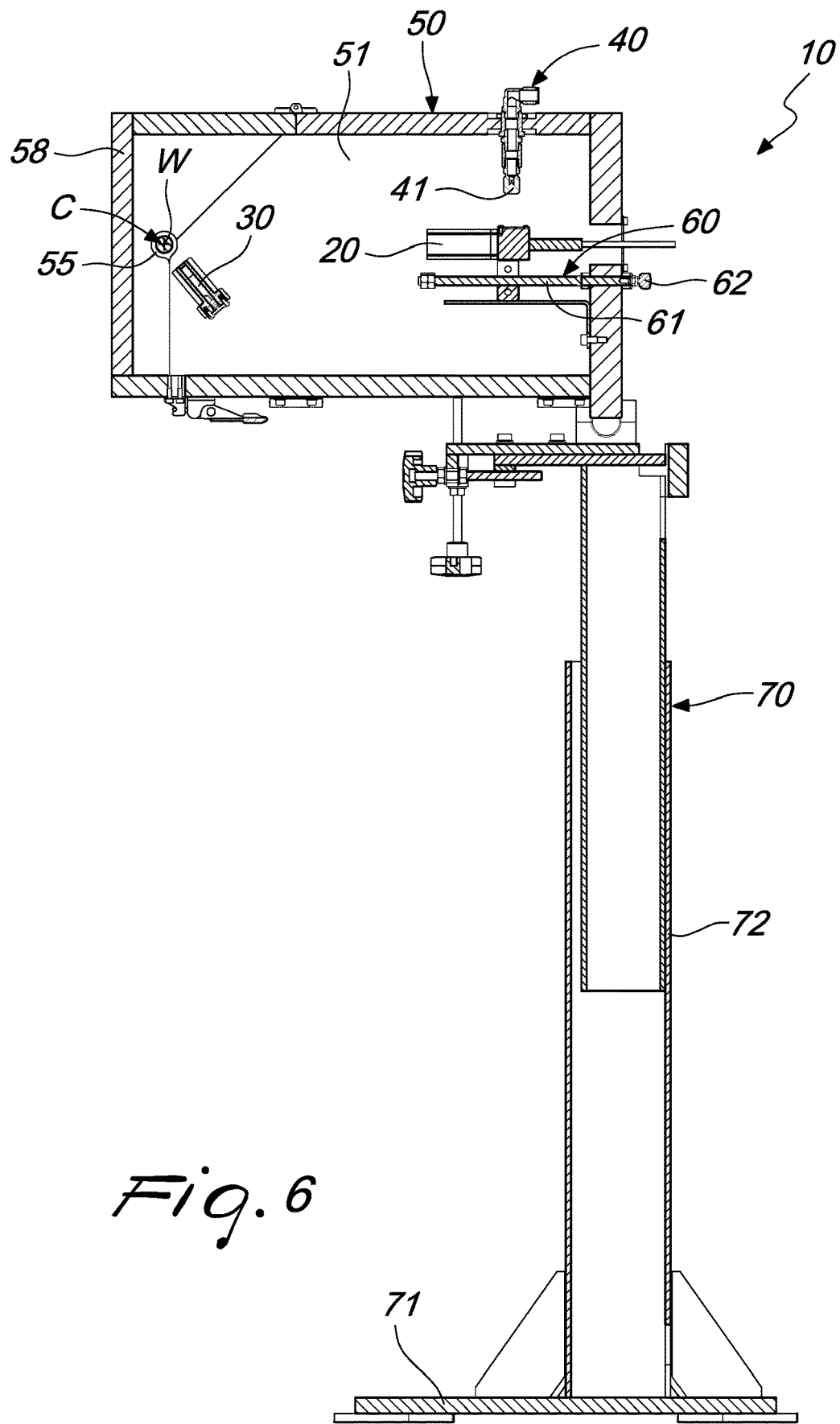
FIG. 6 is a cross-sectional view taken along a vertical plane of the part of the apparatus shown in FIG. 5.
Figure 7:
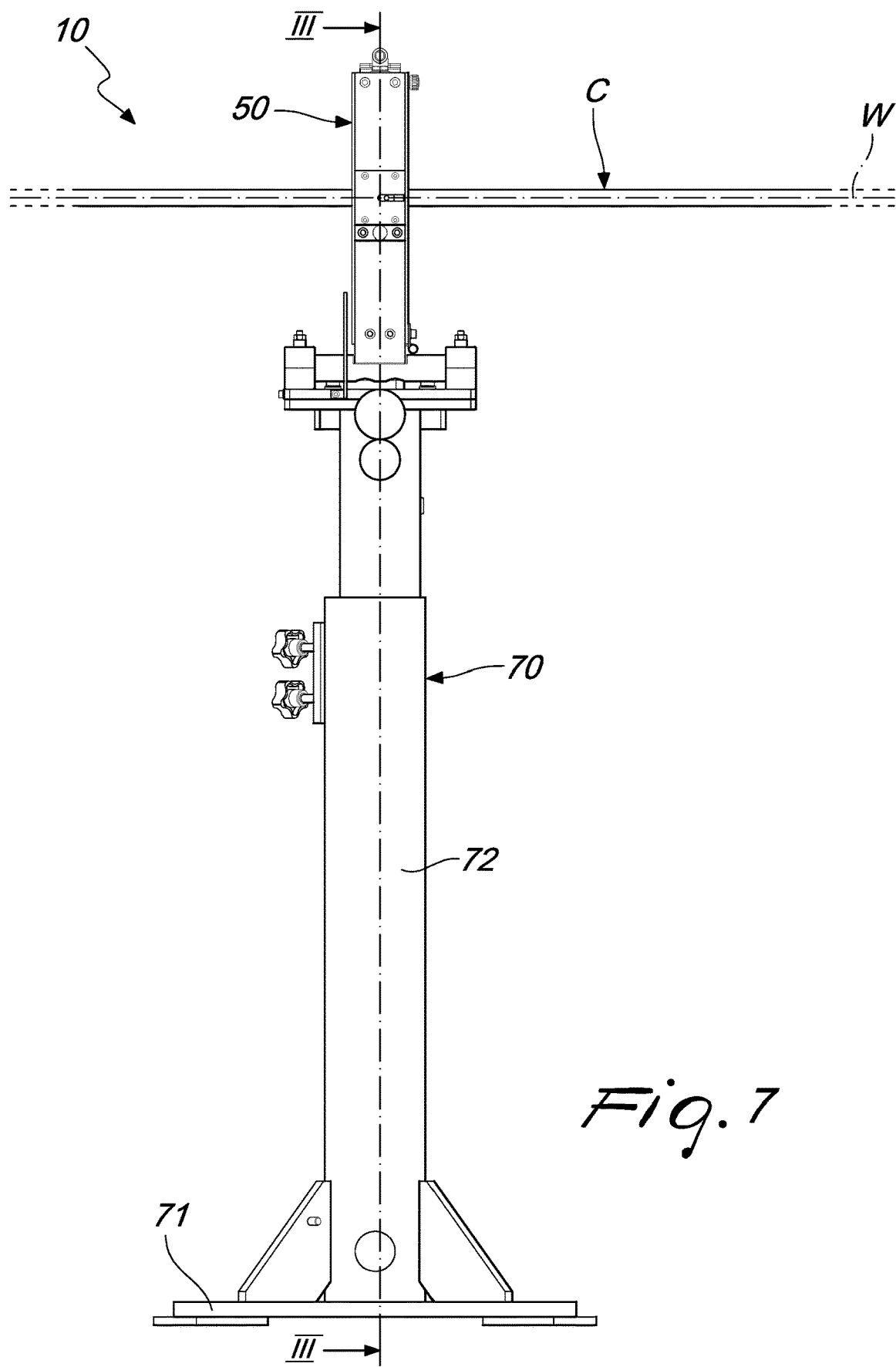
FIG. 7 is a front elevation view of the part of the apparatus shown in FIG. 5.
Figure 8:
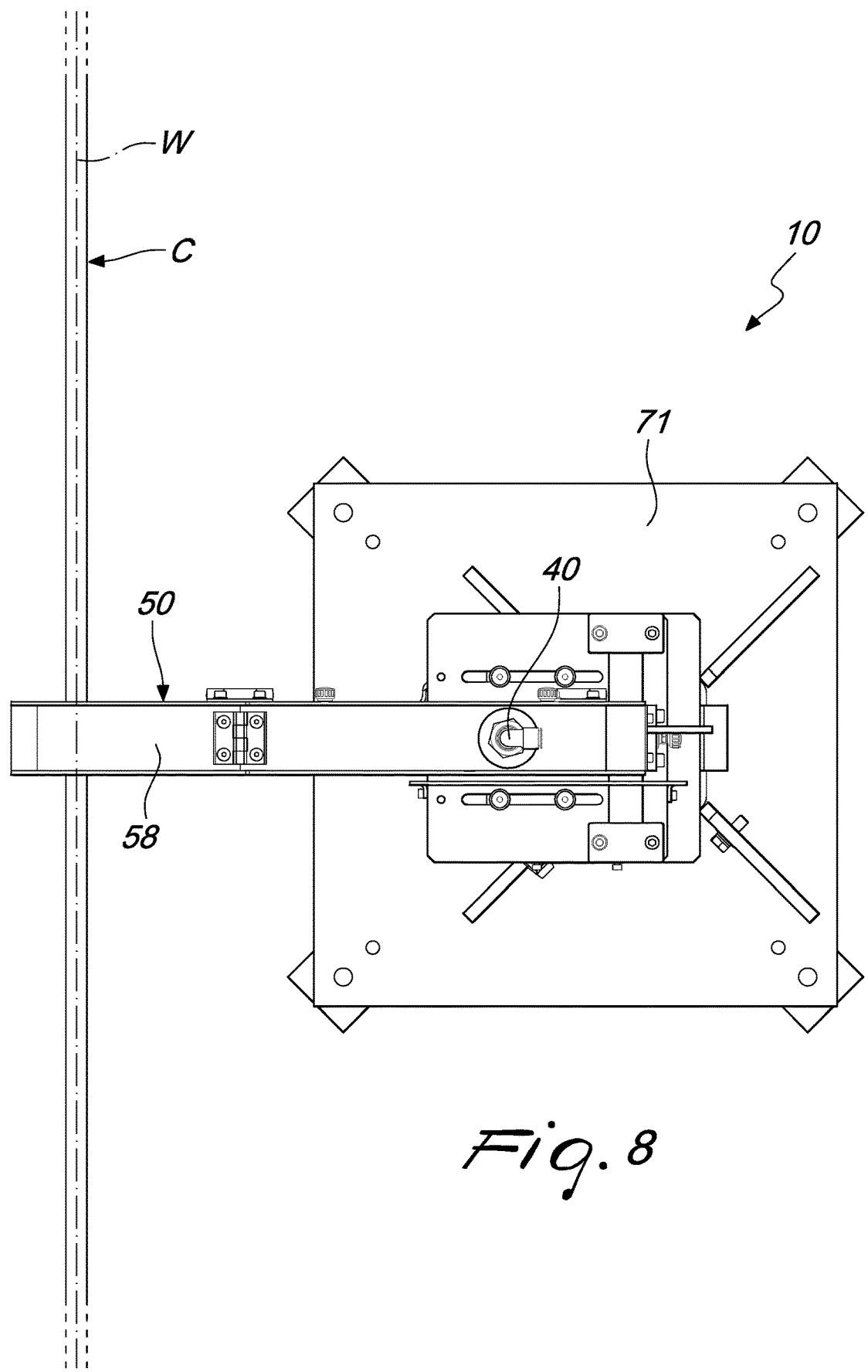
FIG. 8 is a plan view from above of the part of the apparatus shown in FIG. 5.

FIG. 4 shows the reference color T and the main color P in HSL space, each one represented as a point $T(H_T,S_T,L_T)$, $P(H_P,S_P,L_P)$ identified by a corresponding set of three cylindrical coordinates H,S,L, and the Euclidean distance d between these, which is calculated from the HSL coordinates with conventional mathematical methods.

In more detail, in a possible embodiment of the first algorithm 200 for calculating the numeric color index J, this comprises the following steps, downstream of the acquisition (block 101) of the digital image:

a. optionally, executing a procedure for digitally processing the images to remove the background (commonly known simply as "background subtraction") with which the cable C in motion is isolated from the rest of the digital image (i.e. separated from any stationary background);

b. optionally, executing a procedure for digitally processing the images to apply one or more masks (in particular those known as "erosion" and "dilation") in order to identify and isolate the cable C in the digital image;

c. if necessary converting the image, optionally processed at points a. and b., from RGB to HSL (block 201 of the flowchart);

d. identifying one or more main colors P in the converted image (block 202);

e. for each main color identified:

e1. isolating the pixels of that main color;

e2. calculating the average of each of the values of the H, S, L components of the isolated pixels, for example according to the formula:

$$\overline{P_{(H,S,L)}} = \alpha \Sigma_{i=0}^{N} P_{Hi} + \beta \Sigma_{i=0}^{N} P_{Si} + \gamma \Sigma_{i=0}^{N} P_{Li},$$

where the coefficients $\alpha$, $\beta$ and $\gamma$ are weighting coefficients expressed in the form $\alpha=\alpha'/N$, $\beta=\beta'/N$ and $\gamma=\gamma'/N$, respectively, where N is the number of isolated pixels and $\alpha'$, $\beta'$ and $\gamma'$ are dimensionless values chosen according to the technical necessities of the case, and determine the point $P(H_P,S_P,L_P)$ in cylindrical coordinates using the three calculated average values (block 203) as the set of three coordinates;

e3. calculating the color index J as the Euclidean distance d between the point of the main color $P(H_P,S_P,L_P)$ and the point of the predetermined reference color $T(H_T,S_T,L_T)$ (block 204).

At the end of the algorithm 200, the color index J is compared with at least one respective threshold value a, b as described previously (blocks 205 and 206) in order to optionally produce the adapted signals (blocks 216, 217, 218).

In a possible embodiment of the second algorithm 300 for calculating the numeric roughness index R, this comprises the following steps, downstream of the acquisition (101) of the digital image:

a. converting the acquired digital image to grayscale (block 301);

b. selecting and isolating at least one delimited region of interest of the image (block 302);

c. processing such region of interest by way of a mathematical model known as a convolutional neural network (CNN), which has previously been trained to return a numeric roughness index R that is proportional to the roughness of the surface (block 303).

At the end of the algorithm 300, the numeric roughness index R is compared with the respective threshold value as described previously (blocks 304 and 305) in order to optionally produce the adapted signals (blocks 316, 317, 318).

The convolutional neural network used is an artificial neural network based on a mathematical model that emulates the operation of the animal visual cortex. This convolutional neural network comprises computational units (kernels) that scan the image to be processed, subdividing it into sub-zones, and extract the characteristics (features) that are used to discriminate the desired information (in this case the roughness).

Coaching of the convolutional neural network (i.e. refinement of the mathematical model) is done by way of an iterative procedure commonly known as "training", during which the convolutional neutral network is used to process a large number of examples (images) with which the desired output is associated (in this case the roughness index R). The mathematical model is progressively reconfigured during the training procedure until such time as a sufficient level of reliability is obtained.

Conveniently, the first 200 and the second 300 algorithm are executed continuously on the series of images (i.e. on the frames) acquired by the digital video camera 20, so as to have a continuous monitoring of the optically-detectable characteristics of the surface of the cable C (roughness and color).

Preferably, the method 100 described herein is carried out by way of an apparatus for checking the production quality of a cable A, also according to the present disclosure.

Again with reference to the figures, and in particular to FIG. 1 and FIGS. 5-8, the apparatus for checking the production quality of a cable C, generally designated by the reference numeral 1, is adapted in particular to check a cable that is provided with a protective sheath and even more specifically, in the preferred embodiments, is configured to check the quality of an electrical cable within a production line, in output from an extrusion apparatus, while the cable is moved along an advancement axis W.

The apparatus 1 comprises at least one digital video camera 20 which is pointed toward the advancement axis W of the cable C (i.e. with the lens directed toward the advancement axis W and the optical axis incident on the latter) and preferably is arranged with the optical axis substantially perpendicular to the advancement axis W of the cable C (which corresponds to the longitudinal axis of the cable C), so as to acquire digital images of the external surface of the sheath of the cable C.

In the embodiment shown, there is only one digital video camera 20; in other embodiments there are more than one digital video cameras 20 and they are arranged in a radial system about the advancement axis W of the cable C (i.e. with the respective optical axes arranged like several spokes of a circumference centered on the advancement axis W) and preferably they are angularly mutually equidistant; in a particular preferred embodiment, the apparatus 1 comprises three digital video cameras 20, arranged in a radial system about the advancement axis W of the cable C and angularly mutually equidistant (and therefore spaced apart at an angle of 120° from each other), so that the three digital video cameras 20 are capable of simultaneously capturing the entire outer circumference of the cable C.

The one or more digital video cameras 20 are therefore configured to acquire images of the external surface of the cable C (and more precisely of the protective sheath) while this advances along the advancement axis W.

Conveniently, these digital video cameras 20 comprise conventional video cameras which have technical specifications that render them capable of acquiring images with a low exposure time and therefore at least of acquiring images in focus of the surface of a cable C that is being moved along the advancement axis W at a speed equal to 1500 m/min, and preferably video cameras with a minimum exposure time equal to or less than 4 μsec. Conveniently, the at least one digital video camera 20 is associated with a lens with a focal length (for example 50 mm) which is selected according to the technical necessities of the case, or more precisely according to the diameter of the cable C.

The one or more digital video cameras 20 are functionally connected to an electronic processing unit 90 which is configured to process the images by way of one or more algorithms 200, 300 in accordance with the method 100 described previously, so as to calculate one or more numeric indices J, R, each one of which is proportional to a respective optically-detectable characteristic of the external surface of the cable C.

The electronic processing unit 90 is, in other words, any electronic device that is capable of receiving and processing data, such as for example a programmable electronic controller, a computer or the like, or, more generally, any programmable electronic apparatus which is provided with a microprocessor or a microcontroller or the like and with a memory unit.

The electronic processing unit 90 is configured by way of adapted software which implements one or more algorithms 200, 300, such as for example the ones described previously in detail, so as to process the images of the surface of the cable C that are acquired by the at least one digital video camera 20 and, using this, calculate the one or more numeric indices J, R which are proportional to respective optically-detectable characteristics of the surface.

Conveniently, the electronic processing unit 90 is functionally connected to one or more alarm and/or interface devices 81, 82 which are configured to provide at least one message or signal as a function of the at least one numeric index J, R calculated by way of the respective algorithm 200, 300, such as for example signals of optimal quality, acceptable quality 217, 317, and alarm signals 218, 308, as previously described.

According to requirements, the electronic processing unit 90 can optionally be connected, in a known manner, to a plurality of interface devices 81, 82 which may be identical or different, for example by way of a data transfer network 99 (local or internet) and/or data transfer cables and/or by way of a wireless system.

The interface devices 81, 82 comprise for example a monitor and/or one or more counters and/or an interactive panel 81 or the like, positioned proximate to the part 10 of the apparatus 1 where the detection of the images takes place or proximate to the production line of the cable C, and/or mobile devices 82, such as smartphones or tablet computers, and/or any computer connected to the data transfer network 99 and/or one or more acoustic and/or illuminated emitters (LEDs, beepers, sirens etc.).

Advantageously, through one or more of the interface devices 81, 82 it is possible to send data to the electronic processing unit 90 in order to configure it, for example by setting the threshold values a, b, f, g and/or the reference color.

In the preferred embodiments, the electronic processing unit 90 is connected, by way of the data transfer network 99, to a web interface which is accessible by the interface devices 82.

Preferably, the apparatus 1 comprises at least one light source 30 which is configured to emit an incident light on the external surface of the cable C so as to illuminate at least the region of this surface which is targeted by the at least one digital video camera 20.

In some embodiments, including the one illustrated, the light source 30 comprises a high-intensity spotlight positioned proximate to the advancement axis W of the cable C, with the optical axis is incident on this; in other embodiments, the light source 30 comprises light-emitting devices of another type, such as for example one or more high-intensity LEDs or LED strips. The light sources 30 can be more than one in number, according to requirements.

Preferably, the apparatus 1 also comprises a protective containment body 50, such as for example a box-like body, which defines internally a working volume 51 which contains the digital video cameras 20, the light source 30 if present and, during operation, at least one portion of the cable C which comprises the region of the external surface which is targeted by the digital video cameras 20.

Conveniently, the protective containment body 50 comprises an inlet hole 55 and an exit hole 56, which are coaxial and are positioned on opposite sides of the protective containment body 50 and are adapted to be passed through by the cable C during operation; in practice the holes 55, 56 are positioned coaxially to the advancement axis W of the cable C so as to define a passage for this.

Optionally, the protective containment body 50 also comprises a hatch 58 which can be opened and closed and which permits access, by an operator, to the working volume 51, so as to allow the maintenance and adjustment of the elements contained therein.

According to an optional and advantageous characteristic, the apparatus 1 comprises a source of compressed gas 40, which is provided with a gas emission nozzle 41 which protrudes into the working volume 51, and which is configured to introduce a pressurized gas (preferably air) into the working volume 51. The introduction of pressurized gas advantageously creates a pressurization of the working volume 51 which reduces the introduction of dust and other unwanted elements, in order to prevent occlusion of the lens of the digital video camera 20 and interference with the image acquisition procedure.

In the preferred embodiments, the protective containment body 50 is supported by a supporting structure 70 with respect to which the protective containment body 50 proper can be inclined in a controllable manner. Preferably, the inclination of the protective containment body 50 is controllable by way of a goniometer 79 fixed to the supporting structure 70.

In the preferred and illustrated embodiment, the supporting structure 70 comprises a base 71 and a height-adjustable telescopic column 72.

According to another optional characteristic, the at least one digital video camera 20 is mechanically connected to a mechanism for adjusting the position 60, which comprises for example a guide 61 along which the digital video camera 20 is slideable and an adjustment knob 62 configured to guide the displacement of the digital video camera 20 along the guide 61. Conveniently, the adjustment knob 62 is motorized, so as to automate the adjustment of the position of the digital video camera 20.

Preferably the light source 30 is also coupled to a respective adjustment mechanism (not shown) which is configured to guide the displacement of the light source 30 with respect to the advancement axis W of the cable C.

Operation of the apparatus for checking the production quality of a cable that is provided with sheath is clear and evident from the foregoing description.

Note that, during operation, the apparatus does not interfere mechanically in any way with the cable C and therefore it causes no slowing of the production process, nor any alteration of the cable C.

Furthermore, the checking conducted in real time, during the production process, makes it possible to execute prompt corrective interventions on the production line in the event of deterioration of the quality of the characteristics detected.

In practice it has been found that the method and the apparatus for checking the production quality of cables that are provided with a sheath, according to the present disclosure, achieve the intended aim and objects in that they enable checking that is more precise and reliable with respect to the known art.

Another advantage of the method and of the apparatus for checking the production quality of cables that are provided with a sheath, according to the disclosure, consists in that they enable checking that can be automated and standardized.

Another advantage of the method and of the apparatus for checking the production quality of cables that are provided with a sheath, according to the disclosure, consists in that they make it possible to check the entire production.

Another advantage of the method and of the apparatus for checking the production quality of cables that are provided with a sheath, according to the disclosure, consists in that they make it possible to check the cable during the production process.

Another advantage of the method and of the apparatus for checking the production quality of cables that are provided with a sheath, according to the disclosure, consists in that they do not slow down the production process.

Another advantage of the method and of the apparatus for checking the production quality of cables that are provided with a sheath, according to the disclosure, consists in that they permit prompt corrective interventions on the production line in the event of deterioration of quality.

Another advantage of the method and of the apparatus for checking the production quality of cables that are provided with a sheath, according to the disclosure, consists in that they are easy to implement and are economically competitive when compared to the known art.

The method and the apparatus for checking the production quality of cables that are provided with a sheath, thus conceived, are susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

In conclusion, the scope of protection of the claims shall not be limited by the explanations or by the preferred embodiments illustrated in the description by way of examples, but rather the claims shall comprise all the patentable characteristics of novelty that reside in the present disclosure, including all the characteristics that would be considered as equivalent by the person skilled in the art.

The present disclosure further relates to an apparatus for checking the production quality of a cable that is provided with a protective sheath, in particular an electrical cable.

What is claimed is:

1. A method for checking the production quality of a cable that is provided with a protective sheath comprising the steps of:
   acquiring images of an external surface of said cable by way of one or more digital video cameras, while said cable is moved along an advancement axis; and
   processing said images by way of one or more algorithms in order to calculate one or more numeric indices, each numeric index of the one or more numeric indices is proportional to a respective optically-detectable characteristic of said external surface of said cable, wherein said images are processed by way of a first algorithm to calculate a numeric color index proportional to the color difference between a color of said external surface and a predetermined reference color, and wherein said numeric color index is defined as the Euclidean distance between a set of three cylindrical coordinates of a main color of at least one of the acquired images and a set of three cylindrical coordinates of the reference color; each cylindrical coordinate of said sets of three cylindrical coordinates comprising a first coordinate constituted by the wavelength value of the color, a second coordinate constituted by the saturation value of the color, and a third coordinate constituted by the lightness value of the color.

2. The method according to claim 1, wherein said images are processed by way of a second algorithm to calculate a numeric roughness index proportional to a roughness of said external surface.

3. The method according to claim 2, wherein said numeric roughness index is calculated by carrying out at least the following steps of:
   a. converting said image to grayscale;
   b. selecting at least one delimited region of interest of said image; and
   c. processing said region of interest by way of a convolutional neural network which has previously been trained to return a numeric roughness index that is proportional to the roughness of the surface.

4. The method according to claim 1, wherein each numeric index of said one or more numeric indices is compared with a respective threshold value, and if one numeric index of said one or more numeric indices is greater than said respective threshold value, then an alarm signal is produced.

5. An apparatus for checking the production quality of a cable that is provided with a sheath, comprising at least one digital video camera aimed at an advancement axis of said cable, said at least one digital video camera is configured to acquire images of the external surface of said cable and is functionally connected to an electronic processing unit which is configured to process said images by way of one or more algorithms in order to calculate one or more numeric indices, each numeric index is proportional to a respective optically-detectable characteristic of said external surface of said cable, wherein said images are processed by way of a first algorithm to calculate a numeric color index proportional to the color difference between a color of said external surface and a predetermined reference color, and wherein said numeric color index is defined as the Euclidean distance between a set of three cylindrical coordinates of a main color of at least one of the acquired images and a set of three cylindrical coordinates of the reference color; each cylindrical coordinate of said sets of three cylindrical coordinates comprising a first coordinate constituted by the wavelength value of the color, a second coordinate constituted by the saturation value of the color, and a third coordinate constituted by the lightness value of the color.

6. The apparatus according to claim 5, wherein said electronic processing unit is functionally connected to at least one alarm or interface device configured to provide at least one message or signal as a function of said at least one numeric index.

7. The apparatus according to claim 5, further comprising three digital video cameras arranged in a radial configuration around said advancement axis of said cable.

8. The apparatus according to claim 5, further comprising at least one light source configured to emit an incident light on said external surface of said cable so as to illuminate at least one region of said external surface of said cable which is targeted by said at least one digital video camera.

9. The apparatus according to claim 5, comprising:

a protective containment body which defines internally a working volume which contains said at least one digital video camera and is adapted to contain, during operation, at least one portion of said cable which comprises a region of said external surface which is targeted by said at least one digital video camera; and a source of compressed gas configured to introduce a pressurized gas into said working volume.

* * * * *